United States Patent
Yoon et al.

(10) Patent No.: US 11,999,841 B2
(45) Date of Patent: Jun. 4, 2024

(54) THERMOPLASTIC RESIN COMPOSITION HAVING HIGH RIGIDITY AND LOW COEFFICIENT OF LINEAR THERMAL EXPANSION AND MOLDED ARTICLE COMPRISING SAME

(71) Applicants: HYUNDAI MOTOR COMPANY, Seoul (KR); KIA CORPORATION, Seoul (KR); GS CALTEX CORPORATION, Seoul (KR)

(72) Inventors: Jin Young Yoon, Gimpo-si (KR); Hee Joon Lee, Seoul (KR); Dong Eun Cha, Hwaseong-si (KR); Sun Jun Kwon, Seoul (KR); Chun Ho Park, Seoul (KR); Seung Ryong Jeong, Seoul (KR); Seok Jin Yong, Daejeon (KR); Hyung Tak Lee, Daejeon (KR)

(73) Assignees: HYUNDAI MOTOR COMPANY, Seoul (KR); KIA CORPORATION, Seoul (KR); GS CALTEX CORPORATION, Daejeon (KR)

( * ) Notice: Subject to any disclaimer, the term of this patent is extended or adjusted under 35 U.S.C. 154(b) by 7 days.

(21) Appl. No.: 17/858,565

(22) Filed: Jul. 6, 2022

(65) Prior Publication Data
US 2023/0024056 A1 Jan. 26, 2023

(30) Foreign Application Priority Data
Jul. 9, 2021 (KR) .......................... 10-2021-0090042

(51) Int. Cl.
*C08L 23/16* (2006.01)
*C08L 23/10* (2006.01)

(52) U.S. Cl.
CPC ......... *C08L 23/16* (2013.01); *C08L 2205/025* (2013.01); *C08L 2205/03* (2013.01); *C08L 2205/06* (2013.01); *C08L 2205/24* (2013.01)

(58) Field of Classification Search
None
See application file for complete search history.

(56) References Cited

FOREIGN PATENT DOCUMENTS

| JP | 2008-205266 A | 9/2008 |
|----|----|----|
| JP | 2011-071580 A | 4/2011 |
| JP | 5277785 B2 | 8/2013 |
| JP | 5636320 B2 | 12/2014 |

OTHER PUBLICATIONS

ASTM Standard D790, 2017, "Standard Test Methods for Flexural Properties of Unreinforced and Reinforced Plastics and Electrical Insulating Materials", ASTM International. (Year: 2017).*
ASTM Standard E831, 2019. "Standard Test Method for Linear Thermal Expansion of Solid Materials by Thermomechanical Analysis", ASTM International. (Year: 2019).*

* cited by examiner

*Primary Examiner* — Richard A Huhn
(74) *Attorney, Agent, or Firm* — MCDONNELL BOEHNEN HULBERT & BERGHOFF LLP

(57) ABSTRACT

The present disclosure provides a thermoplastic resin composition having high rigidity and a low coefficient of linear thermal expansion and a molded article including the same. The thermoplastic resin composition includes a first propylene-ethylene copolymer, a second propylene-ethylene copolymer, a thermoplastic elastomer, an inorganic filler, and a sodium-phosphate-based nucleating agent as appropriate, and thus a molded article produced therefrom can exhibit improved mechanical rigidity, impact resistance, and dimensional stability. Even when formed to a low thickness for weight reduction, the molded article can be imparted with excellent processability, high tensile strength, a high flexural modulus, and high impact strength.

14 Claims, No Drawings

THERMOPLASTIC RESIN COMPOSITION HAVING HIGH RIGIDITY AND LOW COEFFICIENT OF LINEAR THERMAL EXPANSION AND MOLDED ARTICLE COMPRISING SAME

CROSS REFERENCE TO RELATED APPLICATIONS

This application claims under 35 U.S.C. § 119(a) the benefit of priority from Korean Patent Application No. 10-2021-0090042, filed on Jul. 9, 2021, the entire contents of which are incorporated herein by reference.

BACKGROUND

(a) Technical Field

The present disclosure relates to a thermoplastic resin composition having high rigidity and a low coefficient of linear thermal expansion and a molded article including the same.

(b) Background Art

With the trend of increasingly stringent international environmental regulations and fuel economy regulations and the rising price of energy resources, new technologies for the development of materials and parts for automobiles are urgently required from the viewpoints not only of simply improving fuel efficiency but also of increasing competitiveness according to environmental regulations.

A promising way to improve the fuel efficiency of automobiles is weight reduction technology. By reducing the weight thereof, engine efficiency may be improved, and the performance of automobiles may be maximized, and increased fuel efficiency will be shown.

The weight reduction of automobiles is broadly divided into weight reduction of materials achieved using hollow materials, weight reduction of materials achieved through foaming, and weight reduction of materials achieved through part thinning.

In general, the weight reduction of materials through thinning is achieved in a manner such that the thinning is carried out while maintaining the physical properties of parts using high-rigidity inorganic fillers such as long fibers, carbon fibers and the like. However, this method results in poor moldability, so the appearance of parts is not uniform during molding, and a problem of poor dimensional stability in the longitudinal and transverse directions may occur.

With the goal of solving this problem, composite polypropylene to which a high-fluidity resin and a high-rigidity inorganic filler are applied may be devised. However, if the injection flowability of the composite polypropylene is too high or too low, flow marks may be formed, and thin parts cannot be manufactured unless an appropriate inorganic filler is used. In particular, polypropylene as a base resin becomes crystallized during melting, molding, and cooling steps of injection molding, and dimensional stability is highly likely to be problematic due to the high shrinkage rate and the high coefficient of linear thermal expansion of polypropylene.

SUMMARY

Accordingly, an objective of the present disclosure is to provide an automobile exterior material having reduced weight through thin-part molding.

Another objective of the present disclosure is to provide a thermoplastic resin composition capable of producing a molded article having excellent mechanical properties such as rigidity and the like while simultaneously exhibiting good dimensional stability.

The objectives of the present disclosure are not limited to the foregoing, and will be able to be clearly understood through the following description and to be realized by the means described in the claims and combinations thereof.

An embodiment of the present disclosure provides a thermoplastic resin composition including a first propylene-ethylene copolymer having a melt index of 100 g/10 min to 150 g/10 min measured at a temperature of 230° C. under a load of 2.16 kg, a second propylene-ethylene copolymer having a melt index of 20 g/10 min to 40 g/10 min measured at a temperature of 230° C. under a load of 2.16 kg, a thermoplastic elastomer including a first elastomer having a melt index of 0.5 g/10 min to 1 g/10 min measured at a temperature of 230° C. under a load of 2.16 kg and a second elastomer having a melt index of 20 g/10 min to 40 g/10 min measured at a temperature of 230° C. under a load of 2.16 kg, an inorganic filler, and a sodium-phosphate-based nucleating agent, in which the thermoplastic resin composition has a flexural modulus (FM) of 2,500 MPa or more and a coefficient of linear thermal expansion (CLTE) of 60 μm/m·° C. or less.

The first propylene-ethylene copolymer may have a flexural modulus of 1700 MPa or more.

The first propylene-ethylene copolymer may include 6 wt % to 10 wt % of ethylene based on the total weight thereof.

The second propylene-ethylene copolymer may have a flexural modulus of 1600 MPa or more.

The second propylene-ethylene copolymer may have impact strength of 60 J/m or more at room temperature (25° C.).

The second propylene-ethylene copolymer may include 2 wt % to 5 wt % of ethylene based on the total weight thereof.

The thermoplastic elastomer may include the first elastomer and the second elastomer at a mass ratio of 1:0.5-2.

The thermoplastic elastomer may include at least one selected from the group consisting of a copolymer of ethylene and α-olefin having 4 to 12 carbon atoms, a styrene-diene copolymer, and combinations thereof.

The inorganic filler may have an average particle diameter of 2 μm or less.

The inorganic filler may have an aspect ratio of 20 or more.

The inorganic filler may include at least one selected from the group consisting of talc, silica, wollastonite, mica, calcium carbonate, barium sulfate, magnesium oxide, calcium silicate, and combinations thereof.

The sodium-phosphate-based nucleating agent may include a compound represented by Chemical Formula 1 below:

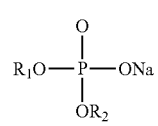

Chemical Formula 1 in Chemical Formula 1, $R_1$ and $R_2$ are each independently hydrogen, a substituted or unsubstituted alkyl group having 1 to 10 carbon atoms, Chemical Formula 2 below, or Chemical Formula 3 below in which $R_1$ and $R_2$ are linked to each other,

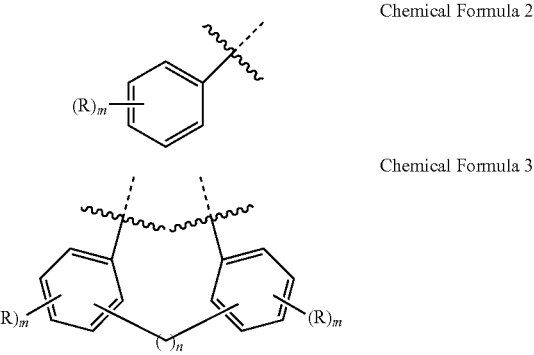

Chemical Formula 2

Chemical Formula 3 in Chemical Formulas 2 and 3, R is independently a substituted or unsubstituted alkyl group having 1 to 10 carbon atoms, m is an integer from 0 to 3, and n is an integer from 0 to 3.

The sodium-phosphate-based nucleating agent may include a compound represented by Chemical Formula 4 below:

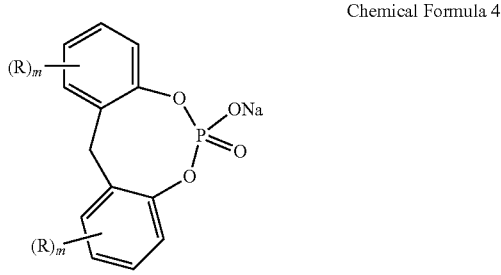

Chemical Formula 4 in Chemical Formula 4, R is a substituted or unsubstituted alkyl group having 1 to 10 carbon atoms, and m is an integer of 0-3.

The thermoplastic resin composition may include 40 wt % to 55 wt % of the first propylene-ethylene copolymer, 5 wt % to 10 wt % of the second propylene-ethylene copolymer, 15 wt % to 25 wt % of the thermoplastic elastomer, 22 wt % to 30 wt % of the inorganic filler, and 0.2 wt % to 2 wt % of the sodium-phosphate-based nucleating agent.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

Another embodiment of the present disclosure provides a molded article including the thermoplastic resin composition described above.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

According to the present disclosure, it is possible to maximize the performance of automobiles by reducing the weight of an automobile exterior material.

In addition, according to the present disclosure, it is possible to obtain a thermoplastic resin composition capable of producing a molded article having excellent mechanical properties such as rigidity and the like while simultaneously exhibiting good dimensional stability.

The effects of the present disclosure are not limited to the foregoing, and should be understood to include all effects that may be reasonably anticipated from the following description.

DETAILED DESCRIPTION

The above and other objectives, features and advantages of the present disclosure will be more clearly understood from the following preferred embodiments. However, the present disclosure is not limited to the embodiments disclosed herein, and may be modified into different forms. These embodiments are provided to thoroughly explain the disclosure and to sufficiently transfer the spirit of the present disclosure to those skilled in the art.

It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A thermoplastic resin composition according to the present disclosure includes a first propylene-ethylene copolymer having a melt index of 100 g/10 min to 150 g/10 min measured at a temperature of 230° C. under a load of 2.16 kg, a second propylene-ethylene copolymer having a melt index of 20 g/10 min to 40 g/10 min measured at a temperature of 230° C. under a load of 2.16 kg, a thermoplastic elastomer including a first elastomer having a melt index of 0.5 g/10 min to 1 g/10 min measured at a temperature of 230° C. under a load of 2.16 kg and a second elastomer having a melt index of 20 g/10 min to 40 g/10 min measured at a temperature of 230° C. under a load of 2.16 kg, an inorganic filler, and a sodium-phosphate-based nucleating agent.

The thermoplastic resin composition includes a first propylene-ethylene copolymer, a second propylene-ethylene copolymer, a thermoplastic elastomer, an inorganic filler, and a sodium-phosphate-based nucleating agent as appropriate, thereby improving the mechanical rigidity, impact resistance, and dimensional stability of a molded article produced therefrom. Moreover, even when formed to a low thickness for weight reduction, the molded article may be imparted with excellent processability, high tensile strength, a high flexural modulus, and high impact strength.

The first propylene-ethylene copolymer may have a melt index of 100 g/10 min to 150 g/10 min measured at a temperature of 230° C. under a load of 2.16 kg. If the melt index of the first propylene-ethylene copolymer is less than the above lower limit, impregnation properties of the inorganic filler, etc. may be deteriorated, so a poor reinforcement effect may result. On the other hand, if the melt index thereof exceeds the above upper limit, the impact resistance of a molded article made of the thermoplastic resin composition may be deteriorated.

The first propylene-ethylene copolymer may have a flexural modulus of 1,700 MPa or more. The upper limit of the flexural modulus is not particularly limited, and may be, for example, 2,000 MPa or less. A general polypropylene resin is known to have crystallinity of about 40% to 60%, flexural modulus of about 1,200 MPa to 1,500 MPa, and impact strength of about 70 J/m to 150 J/m. The first propylene-ethylene copolymer is high-crystalline polypropylene (HCPP), and thus has impact strength equivalent to that of a general polypropylene resin, and has high flexural modulus and crystallinity, so it is suitable for use in exterior materials for automobiles requiring high rigidity and high impact resistance.

The first propylene-ethylene copolymer may include 6 wt % to 10 wt % of ethylene based on the total weight thereof. If the amount of ethylene in the first propylene-ethylene copolymer is less than the above lower limit, the impact resistance of the molded article may be deteriorated, whereas if the amount thereof exceeds the above upper limit, the rigidity of the molded article may be deteriorated and productivity may be lowered during extrusion.

The first propylene-ethylene copolymer may be an alternating copolymer, a block copolymer, or a random copolymer, and is preferably a block copolymer.

The thermoplastic resin composition may include 40 wt % to 55 wt % of the first propylene-ethylene copolymer. If the amount of the first propylene-ethylene copolymer is less than the above lower limit, the impact resistance of the molded article may be deteriorated, whereas if the amount thereof exceeds the above upper limit, the flowability of the thermoplastic resin composition may be decreased and the dispersibility may be lowered.

The second propylene-ethylene copolymer may have a melt index of 20 g/10 min to 40 g/10 min measured at a temperature of 230° C. under a load of 2.16 kg. If the melt index of the second propylene-ethylene copolymer is less than the above lower limit, impregnation properties of the inorganic filler, etc. may be deteriorated, so a poor reinforcement effect may result. On the other hand, if the melt index thereof exceeds the above upper limit, the impact resistance of the molded article may be deteriorated.

The second propylene-ethylene copolymer may have a flexural modulus of 1,600 MPa or more. The upper limit of the flexural modulus is not particularly limited, and may be, for example, 1,900 MPa or less.

The second propylene-ethylene copolymer may have impact strength of 60 J/m or more at room temperature (25° C.). The upper limit of the impact strength is not particularly limited, and may be, for example, 100 J/m or less. If the impact strength of the second propylene-ethylene copolymer is less than the above lower limit, the impact resistance of the molded article may be deteriorated.

The second propylene-ethylene copolymer may include 2 wt % to 5 wt % of ethylene based on the total weight thereof. If the amount of ethylene in the second propylene-ethylene copolymer is less than the above lower limit, the impact resistance of the molded article may be deteriorated, whereas if the amount thereof exceeds the above upper limit, the rigidity of the molded article may be deteriorated and productivity may be lowered during extrusion.

The second propylene-ethylene copolymer may be an alternating copolymer, a block copolymer, or a random copolymer, and is preferably a block copolymer.

The thermoplastic resin composition may include 5 wt % to 10 wt % of the second propylene-ethylene copolymer. If the amount of the second propylene-ethylene copolymer is less than the above lower limit, the impact resistance of the molded article may be deteriorated, whereas if the amount thereof exceeds the above upper limit, the flowability of the thermoplastic resin composition may be lowered and the dispersibility may be decreased.

The thermoplastic elastomer may include the first elastomer and the second elastomer at a mass ratio of 1:0.5-2, or 1:1.

The first elastomer may have a melt index of 0.5 g/10 min to 1 g/10 min measured at a temperature of 230° C. under a load of 2.16 kg. If the melt index of the first elastomer is less than the above lower limit, dispersion thereof in the thermoplastic resin composition may become difficult due to poor flowability, whereas if the melt index thereof exceeds the above upper limit, the impact resistance of the molded article may be deteriorated.

The second elastomer may have a melt index of 20 g/10 min to 40 g/10 min measured at a temperature of 230° C. under a load of 2.16 kg. If the melt index of the second elastomer is less than the above lower limit, dispersion thereof in the thermoplastic resin composition may become difficult due to poor flowability, whereas if the melt index thereof exceeds the above upper limit, the impact resistance of the molded article may be deteriorated.

The thermoplastic elastomer may include at least one selected from the group consisting of a copolymer of ethylene and α-olefin having 4 to 12 carbon atoms, a styrene-diene copolymer, and combinations thereof. Specifically, the thermoplastic elastomer may include about 12 wt % to about 45 wt % of α-olefin having 4 to 12 carbon atoms. More specifically, the copolymer of ethylene and α-olefin having 4 to 12 carbon atoms may be an ethylene-butene-1 copolymer (EBR) or an ethylene-octene-1 copolymer (EOR).

The thermoplastic elastomer may include a styrene-diene copolymer prepared by copolymerizing a styrene-based monomer and a diene-based monomer. For example, the styrene-based monomer may be any one selected from the group consisting of styrene, α-methylstyrene, α-ethylstyrene, p-methylstyrene, and combinations thereof. The diene-based monomer may be any one selected from the group consisting of butadiene, isoprene, and combinations thereof. Specifically, the styrene-diene copolymer may be any one copolymer selected from the group consisting of a styrene-butylene-styrene block copolymer, a styrene-ethylene-butylene-styrene block copolymer, a styrene-isoprene-styrene block copolymer, a styrene-ethylene-propylene block copolymer, a styrene-ethylene-propylene-styrene block copolymer, and combinations thereof.

The thermoplastic resin composition may include 15 wt % to 25 wt % of the thermoplastic elastomer. If the amount of the thermoplastic elastomer is less than the above lower limit, the impact resistance of the molded article may be deteriorated, whereas if the amount thereof exceeds the above upper limit, the flowability may be decreased and the dispersibility may be lowered.

The inorganic filler is used to achieve weight reduction of the molded article and to impart excellent mechanical rigidity, impact resistance, and dimensional stability thereto.

The inorganic filler takes the form of particles having an average particle diameter of 2 μm or less and an aspect ratio of 20 or more, and is thus distinguished from a plate-like inorganic filler. The upper limit of the aspect ratio is not particularly limited, and may be, for example, 30 or less. The average particle diameter may be measured using a laser diffraction method (ISO 13320-1), and if the average particle diameter of the inorganic filler exceeds the above upper limit, the flowability of the thermoplastic resin composition may be lowered and the dispersibility therein may be deteriorated, so the impact strength may become worse. Also, the dimensional stability of the molded article may be deteriorated.

The inorganic filler may include at least one selected from the group consisting of talc, silica, wollastonite, mica, calcium carbonate, barium sulfate, magnesium oxide, calcium silicate, and combinations thereof.

The thermoplastic resin composition may include 22 wt % to 30 wt % of the inorganic filler. If the amount of the inorganic filler is less than the above lower limit, the rigidity and dimensional stability of the molded article may be insufficient, whereas if the amount thereof exceeds the above upper limit, the weight reduction of the molded article may be insufficient and the impact strength may be deteriorated.

The sodium-phosphate-based nucleating agent is used to increase the rigidity and dimensional stability of the molded article by promoting rapid crystallization of the first propylene-ethylene copolymer and the second propylene-ethylene copolymer.

The sodium-phosphate-based nucleating agent may include a compound represented by Chemical Formula 1 below.

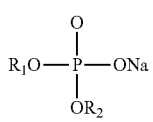

Chemical Formula 1

In Chemical Formula 1, $R_1$ and $R_2$ are each independently hydrogen, a substituted or unsubstituted alkyl group having 1 to 10 carbon atoms, Chemical Formula 2 below, or Chemical Formula 3 below in which $R_1$ and $R_2$ are linked to each other.

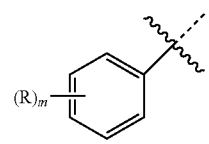

Chemical Formula 2

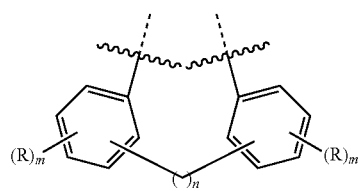

Chemical Formula 3

In Chemical Formulas 2 and 3, R is independently a substituted or unsubstituted alkyl group having 1 to 10 carbon atoms, m is an integer of 0 to 3, and n is an integer of 0 to 3.

Moreover, the sodium-phosphate-based nucleating agent may include a compound represented by Chemical Formula 4 below.

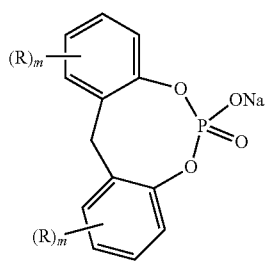

Chemical Formula 4

In Chemical Formula 4, R is a substituted or unsubstituted alkyl group having 1 to 10 carbon atoms, and m is an integer of 0 to 3.

The alkyl group may include at least one selected from the group consisting of a methyl group, an ethyl group, an n-propyl group, an isopropyl group, an n-butyl group, a tert-butyl group, and combinations thereof.

Specifically, the sodium-phosphate-based nucleating agent may include at least one selected from the group consisting of sodium 2,2'-methylene-bis-(4,6-di-tert-butylphenyl)phosphate, sodium 2,2'-methylene-bis-(4-tert-butylphenyl))phosphate, and combinations thereof.

The thermoplastic resin composition may include 0.2 wt % to 2 wt % of the sodium-phosphate-based nucleating agent. If the amount of the sodium-phosphate-based nucleating agent is less than the above lower limit, the tensile strength and flexural strength of the molded article may be deteriorated, whereas if the amount thereof exceeds the above upper limit, the impact strength may be deteriorated.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

The amount of the additive is not particularly limited, and may be, for example, 0.1 wt % to 6 wt %.

The antioxidant may include at least one selected from the group consisting of a phenol-based antioxidant, a phosphite-based antioxidant, thiodipropionate, and combinations thereof.

The slipping agent is used to improve scratch resistance by imparting slipperiness to the surface of a molded article using the thermoplastic resin composition. The slipping agent may include at least one selected from the group consisting of a siloxane-based slipping agent, an amide-based slipping agent, and combinations thereof.

The antistatic agent is used to reduce the generation of static electricity due to friction and to ensure that the additive is uniformly dispersed. The antistatic agent may include at least one selected from the group consisting of a low-molecular-weight antistatic agent, a high-molecular-weight antistatic agent, a conductive polymer, and combinations thereof.

In addition, the present disclosure pertains to a molded article produced using the thermoplastic resin composition. The method of manufacturing the molded article is not particularly limited, and may include various methods, such as injection, extrusion, and the like.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

Also, the molded article is thin and is thus advantageous in view of reducing the weight of exterior materials, and simultaneously exhibits excellent mechanical rigidity, impact resistance, and dimensional stability. For example, the molded article may exhibit excellent mechanical strength and impact resistance even at a thickness of less than about 2.5 mm, or of 2.0 mm to 2.2 mm.

A better understanding of the present disclosure may be obtained through the following examples. These examples are merely set forth to illustrate the present disclosure, and are not to be construed as limiting the present disclosure.

Example and Comparative Examples 1 to 3

Respective thermoplastic resin compositions were obtained by mixing components in the amounts shown in Table 1 below. Specifically, the individual components were kneaded using a Super mixer or a ribbon mixer. Pellets were manufactured through water cooling using a twin-screw extruder (manufacturer: SM, diameter: 45 mm) under conditions of a temperature of 180° C. to 220° C., an extruder screw speed of 240 rpm, and a hopper feed speed of 700 rpm. The pellets were molded into samples having a predetermined shape using an injection-molding machine (manufacturer: Nikita, clamping force: 180 tons) set at 220° C.

TABLE 1

| Component | Example | Comparative Example 1 | Comparative Example 2 | Comparative Example 3 |
|---|---|---|---|---|
| First propylene-ethylene copolymer | 48 wt % | 49 wt % | 48 wt % | 48 wt % |
| Second propylene-ethylene copolymer | 8 wt % | 8 wt % | 8 wt % | 8 wt % |
| Thermoplastic elastomer | 18 wt % | 18 wt % | 18 wt % | 18 wt % |
| Inorganic filler A | 25 wt % | 25 wt % | — | — |
| Inorganic filler B | — | — | 25 wt % | — |
| Inorganic filler C | — | — | — | 25 wt % |
| Sodium-phosphate-based nucleating agent | 1 wt % | — | 1 wt % | 1 wt % |

In Table 1, the thermoplastic elastomer was a mixture of the first elastomer and the second elastomer at the same ratio.

The inorganic filler A had an average particle diameter of 2 μm or less, the inorganic filler B had an average particle diameter of 5 μm, and the inorganic filler C had an average particle diameter of 10 μm.

TEST EXAMPLE

The physical properties of the molded articles according to Example and Comparative Examples 1 to 3 were measured using the following methods and conditions.

(a) Melt index: Measurement was made at a temperature of 230° C. under a load of 2.16 kg according to ASTM D1238.

(b) Tensile strength: Measurement was made at 50 mm/min according to ASTM D638.

(c) Flexural modulus: Measurement was made at 10 mm/min according to ASTM D790.

(d) IZOD impact strength: Measurement was made according to ASTM D256.

(e) Heat deflection temperature (HDT): Measurement was made at a surface pressure of 0.45 MPa according to ASTM D648.

(f) Coefficient of linear thermal expansion (CLTE): Measurement was made according to ASTM E831.

The results thereof are shown in Table 2 below.

TABLE 2

| Item | Example | Comparative Example 1 | Comparative Example 2 | Comparative Example 3 |
|---|---|---|---|---|
| Melt index [g/10 min] | 37 | 37.2 | 37.1 | 37.4 |
| Tensile strength [MPa] | 22.3 | 21 | 20.8 | 22 |
| Flexural modulus [MPa] | 2,610 | 2,480 | 2,510 | 2,520 |
| IZOD impact strength (23° C.) [J/m] | 335 | 322 | 324 | 327 |
| IZOD impact strength (−30° C.) [J/m] | 45 | 41 | 43 | 42 |
| Heat deflection temperature [° C.] | 129 | 121 | 117 | 118 |
| Coefficient of linear thermal expansion [μm/m · ° C.] | 51 | 59 | 74 | 81 |

As is apparent from Table 2, Comparative Example 1 did not contain a sodium-phosphate-based nucleating agent, so the flexural modulus and IZOD impact strength were low. In Comparative Examples 2 and 3, using inorganic fillers having a large average particle diameter, the impact strength was decreased and the coefficient of linear thermal expansion was excessively increased, so the dimensional stability was greatly deteriorated.

In contrast, Example exhibited a flexural modulus of 2,500 MPa or more, a coefficient of linear thermal expansion of 60 μm/m° C. or less, and high IZOD impact strength compared to Comparative Examples 1 to 3. Ultimately, according to the present disclosure, the molded article can exhibit improved mechanical rigidity, impact resistance, and dimensional stability, and even when formed to a low thickness for weight reduction, the molded article can be imparted with excellent processability, high tensile strength, a high flexural modulus, and high impact strength.

Although specific embodiments of the present disclosure have been described, those skilled in the art will appreciate that the present disclosure may be embodied in other specific forms without changing the technical spirit or essential features thereof. Thus, the embodiments described above should be understood to be non-limiting and illustrative in every way.

The invention claimed is:

1. A thermoplastic resin composition comprising:
   a first propylene-ethylene copolymer having a melt index of 100 g/10 min to 150 g/10 min measured at a temperature of 230° C. under a load of 2.16 kg;
   a second propylene-ethylene copolymer having a melt index of 20 g/10 min to 40 g/10 min measured at a temperature of 230° ° C. under a load of 2.16 kg;
   a thermoplastic elastomer comprising a first elastomer having a melt index of 0.5 g/10 min to 1 g/10 min measured at a temperature of 230° C. under a load of 2.16 kg and a second elastomer of a melt index of 20 g/10 min to 40 g/10 min measured at a temperature of 230° ° C. under a load of 2.16 kg;
   an inorganic filler; and
   a sodium-phosphate-based nucleating agent;
   wherein the inorganic filler has an average particle diameter of 2 μm or less.

2. The thermoplastic resin composition of claim 1, wherein the first propylene-ethylene copolymer comprises 6 wt % to 10 wt % of ethylene based on a total weight thereof.

3. The thermoplastic resin composition of claim 1, wherein the second propylene-ethylene copolymer has impact strength of 60 J/m or more at room temperature (25° C.).

4. The thermoplastic resin composition of claim 1, wherein the second propylene-ethylene copolymer comprises 2 wt % to 5 wt % of ethylene based on a total weight thereof.

5. The thermoplastic resin composition of claim 1, wherein the thermoplastic elastomer comprises the first elastomer and the second elastomer at a mass ratio of 1:0.5-2.

6. The thermoplastic resin composition of claim 1, wherein the thermoplastic elastomer comprises at least one selected from the group consisting of: a copolymer of ethylene and α-olefin having 4 to 12 carbon atoms, a styrene-diene copolymer, and combinations thereof.

7. The thermoplastic resin composition of claim 1, wherein the inorganic filler has an aspect ratio of 20 or more.

8. The thermoplastic resin composition of claim 1, wherein the inorganic filler comprises at least one selected from the group consisting of: talc, silica, wollastonite, mica, calcium carbonate, barium sulfate, magnesium oxide, calcium silicate, and combinations thereof.

9. The thermoplastic resin composition of claim 1, wherein the sodium-phosphate-based nucleating agent comprises a compound represented by Chemical Formula 1:

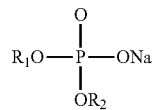

in Chemical Formula 1, $R_1$ and $R_2$ are each independently hydrogen, a substituted or unsubstituted alkyl group having 1 to 10 carbon atoms, Chemical Formula 2:

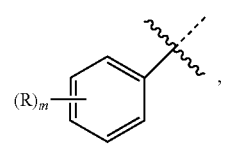

or Chemical Formula 3:

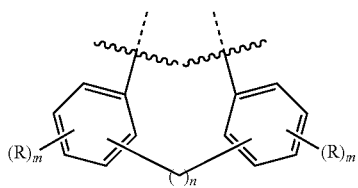

in which $R_1$ and $R_2$ are linked to each other, and in Chemical Formulas 2 and 3, R is independently a substituted or unsubstituted alkyl group having 1 to 10 carbon atoms, m is an integer from 0 to 3, and n is an integer from 0 to 3.

10. The thermoplastic resin composition of claim 1, wherein the sodium-phosphate-based nucleating agent comprises a compound represented by Chemical Formula 4:

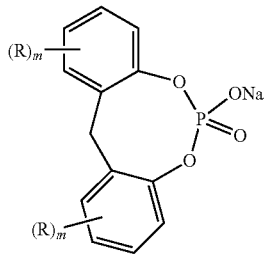

in Chemical Formula 4, R is a substituted or unsubstituted alkyl group having 1 to 10 carbon atoms, and m is an integer of 0-3.

11. The thermoplastic resin composition of claim 1, comprising:

40 wt % to 55 wt % of the first propylene-ethylene copolymer;

5 wt % to 10 wt % of the second propylene-ethylene copolymer;

15 wt % to 25 wt % of the thermoplastic elastomer;

22 wt % to 30 wt % of the inorganic filler; and 0.2 wt % to 2 wt % of the sodium-phosphate-based nucleating agent.

12. The thermoplastic resin composition of claim 1, further comprising at least one additive selected from the group consisting of: an antioxidant, an ultraviolet absorber, a nucleating agent, a coupling agent, a dispersant, a light stabilizer, a processing lubricant, a slipping agent, an antistatic agent, an inorganic pigment, and combinations thereof.

13. A molded article comprising the thermoplastic resin composition of claim 1.

14. The molded article of claim 13, wherein the molded article is at least one automobile exterior material selected from the group consisting of: a side sill molding, door molding, fender molding, quarter glass molding, roof rack, side outer garnish, roof molding garnish, back panel molding, tailgate garnish, and combinations thereof.

* * * * *